G. W. DUNHAM.
ENGINE LUBRICATING SYSTEM.
APPLICATION FILED OCT. 25, 1913.
1,105,894.
Patented Aug. 4, 1914.
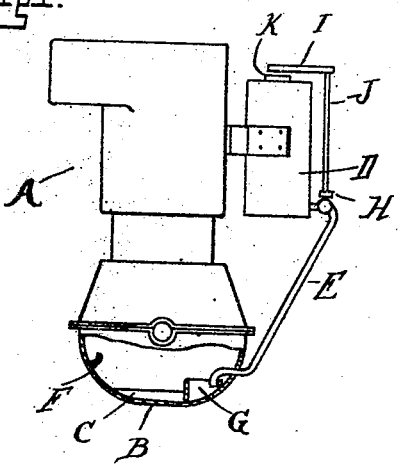
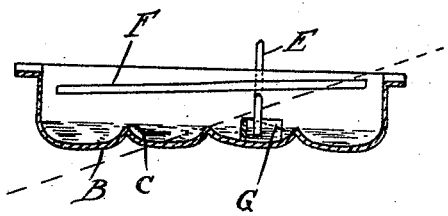
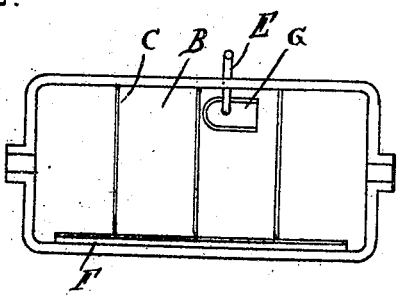
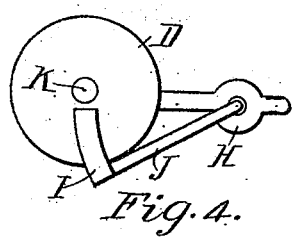
Witnesses
W. K. Ford
James P. Barry
Inventor
George W. Dunham
By Whittemore Hulbert & Whittemore
Atty's

UNITED STATES PATENT OFFICE.

GEORGE W. DUNHAM, OF DETROIT, MICHIGAN, ASSIGNOR TO SAXON MOTOR CAR COMPANY, OF DETROIT, MICHIGAN, A CORPORATION OF MICHIGAN.

ENGINE-LUBRICATING SYSTEM.

1,105,894.

Specification of Letters Patent.  Patented Aug. 4, 1914.

Application filed October 25, 1913. Serial No. 797,181.

*To all whom it may concern:*

Be it known that I, GEORGE W. DUNHAM, a citizen of the United States of America, residing at Detroit, in the county of Wayne and State of Michigan, have invented certain new and useful Improvements in Engine-Lubricating Systems, of which the following is a specification, reference being had therein to the accompanying drawings.

The invention relates to engine lubricating systems of that type in which the lubricant is held in an inverted air-tight receptacle, and is fed therefrom through a conduit to the oil pan, the feed being effected by air displacement when the lower end of said conduit is unsealed. Such systems operate satisfactorily when the pan is level, but where, in the case of a motor vehicle engine on a grade, the pan is tilted, the oil therein will flow to one end, unsealing the oil conduit and permitting an abnormal feeding of oil from the tank.

With my improvement this defect is overcome by an arrangement which prevents the unsealing of the conduit upon the tilting of the pan and at the same time one which does not interfere with the normal operation of the system.

In the drawings: Figure 1 is a diagrammatic cross section through an engine showing my lubricating system applied thereto; Fig. 2 is a longitudinal section through the oil pan; Fig. 3 is a plan view thereof; Fig. 4 is a diagrammatic plan view of the guard and shut-off; Fig. 5 is a detail view of the valve in section.

A is an engine case of any suitable construction; B is the oil pan formed in the lower portion of said casing, and which may be divided longitudinally into sections by transverse ribs C    is an inverted oil receptacle having a discharge conduit E which leads downward into the pan and has its lower end sealed by the oil when at normal level. The lubricant is distributed from the pan by the usual splash system, and the oil thrown up on the side of the case is collected in an inclined trough F, which conveys it to one end of the casing.

With the system as thus far described, a tilting of the case in one direction, as where the vehicle is going up hill, will increase the depth of oil at the point for sealing the end of the conduit E, while in this same position the trough F will operate to feed the splashed oil to the upper end of the engine casing. Thus the normal lubricating effect will be maintained. On the other hand, if the engine is going down hill, the conduit will be unsealed, thereby flooding the pan. I have therefore provided means for avoiding such a result which preferably consists of a semi-circular shield G placed about the lower end of the discharge conduit E, which will hold the oil and maintain the seal when the engine is upon down-grade. This will not, however, interfere with a normal operation on the level or on up-grade, as the shield is cut away at one side as shown.

For convenience in filling the receptacle D, it is provided with a removable fuel cap at its upper end. If, however, this cap were to be removed without shutting off the oil conduit E, the atmospheric air pressure would cause the discharge of all of the oil in the tank into the pan. A valve, such as H, placed in the conduit E, if closed, will prevent such a result, but there is danger that the operator may omit to close the valve. I have avoided this danger by placing a guard I upon the stem J of the valve H, so that it will extend above the cap K for the tank whenever the valve is in open position. On the other hand, the turning of the valve stem J to close the valve will withdraw the shield I so that the cap K may be removed.

With the construction as described in operation, whenever the engine is in level position the depth of the oil in the pan is determined by the position of the lower end of the tube or conduit E. When the casing is tilted upon a down-grade, the shield G will still maintain a small body of oil surrounding the lower end of the tube E, so that the seal is not broken, and flooding of the oil is prevented. This will lessen the amount of oil fed by the splash system to the parts to be lubricated, as more of the lubricant will be at the forward end of the casing which is lower than the rear end. However, such a result is not objectionable, as the engine is not usually under load on down-grade. On the other hand, where the engine is on an up-grade the inclined trough F will return the lubricant to the forward end of the case, which is above the rear end, and by over-flow all of the pockets in the pan will be maintained full.

The fact that the shield G is cut away at one point permits the lubricant to find its level in the horizontal arrangement of the casing, and also where the casing is tilted upon an up-grade.

What I claim as my invention is:

1. In a lubricating system, the combination with an oil pan of an oil discharge conduit having its end sealed by the normal level of oil within said pan, and a shield partially surrounding the discharge end of said conduit, forming a pocket for maintaining the seal when said pan is tilted in one direction, while permitting discharge of lubricant from said pocket when tilted in the opposite direction.

2. In a lubricating system, the combination with an oil pan of an oil discharge conduit having its lower end sealed by the lubricant in said pan at normal level, and a U-shaped shield surrounding the discharge end of said conduit forming a pocket for maintaining the seal when the pan is tilted in one direction and discharging the oil from said pocket when the pan is tilted in the opposite direction.

3. In a lubricating system, the combination with an oil pan of an oil tank closed from atmospheric pressure at its upper end, a discharge conduit for the oil sealed in said pan when the lubricant is at normal level, and a shield in said pan partially surrounding the discharge end of said conduit, forming a pocket for retaining the lubricant when the pan is tilted in one direction, while permitting a flow of oil from said pocket when tilted in the opposite direction.

4. In a lubricating system, the combination with an oil pan of an oil receptacle above the level of said pan having a discharge conduit sealed in said pan at the normal level of oil therein, a cap for closing the upper end of said tank to relieve the oil from atmospheric pressure, a shut-off for said oil discharge conduit, and means for preventing movement of said cap when said conduit is open, said means being operatively connected with said shut-off and adjustable therewith to an inoperable position when said conduit is closed.

5. In a lubricating system, the combination with an oil pan of an oil tank above said pan, having a discharge conduit sealed in said pan at the normal level of oil, a valve in said discharge conduit, a fill cap for the upper end of said tank, and a guard connected with the stem of said valve extending to intercept the removal of said cap when said valve is in other than its closed position.

In testimony whereof I affix my signature in presence of two witnesses.

GEORGE W. DUNHAM.

Witnesses:
 C. E. GREGORY,
 F. C. LIMER.